C. A. WATERBURY.
Photographic Cameras.

No. 133,394. Patented Nov. 26, 1872.

Witnesses:
John Becker
C. Sedgwick

Inventor:
C. A. Waterbury
per Munn &Co
Attorneys.

C. A. WATERBURY.
Photographic Cameras.

No. 133,394

Patented Nov. 26, 1872.

2 Sheets--Sheet 2.

Witnesses:
John Becker.
C. Sedgwick.

Inventor:
C. A. Waterbury
per Munn & Co
Attorneys.

ated November 26, 1872.

UNITED STATES PATENT OFFICE.

CHARLES A. WATERBURY, OF NEW YORK, N. Y.

IMPROVEMENT IN PHOTOGRAPHIC CAMERAS.

Specification forming part of Letters Patent No. 133,394, dated November 26, 1872.

*To all whom it may concern:*

Figure 1:
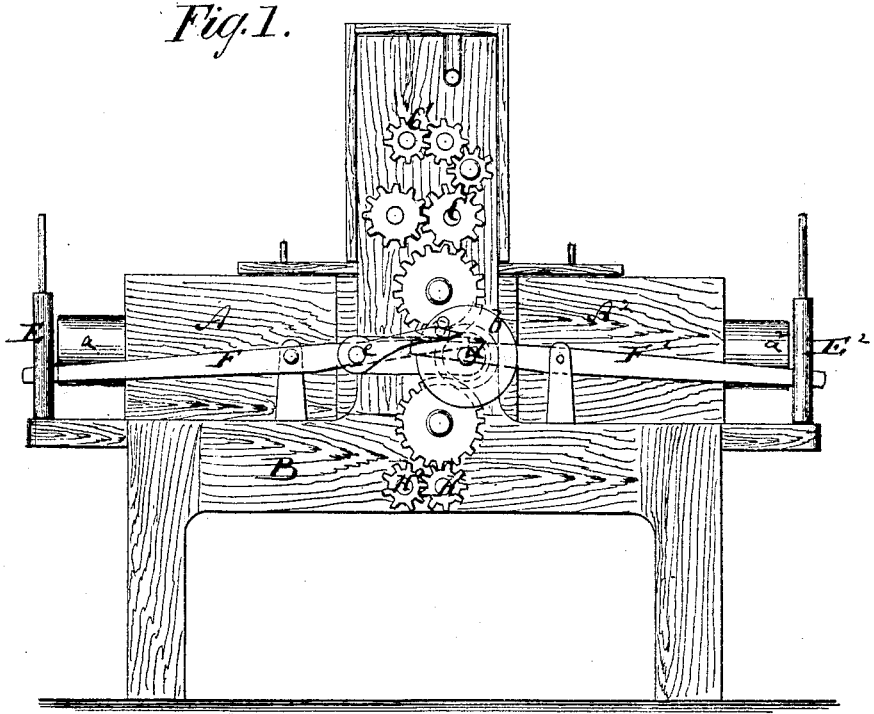
Figure 2:
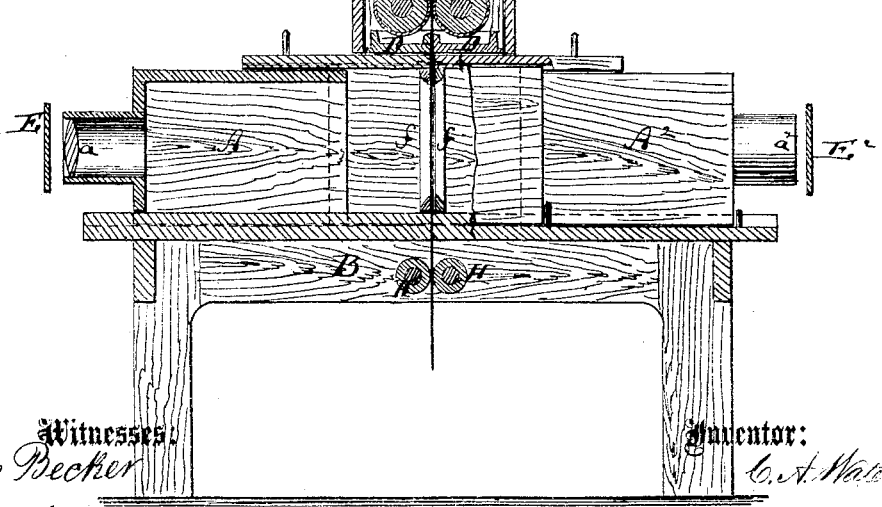
Figure 3:
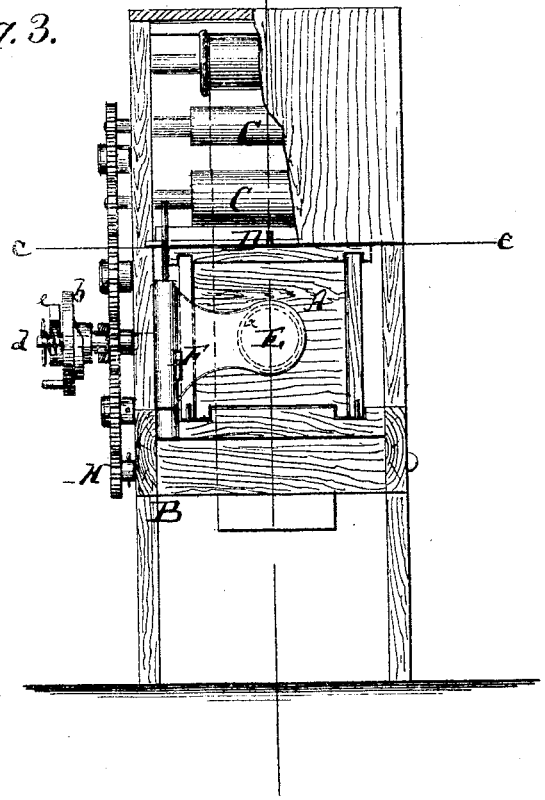
Figure 4:
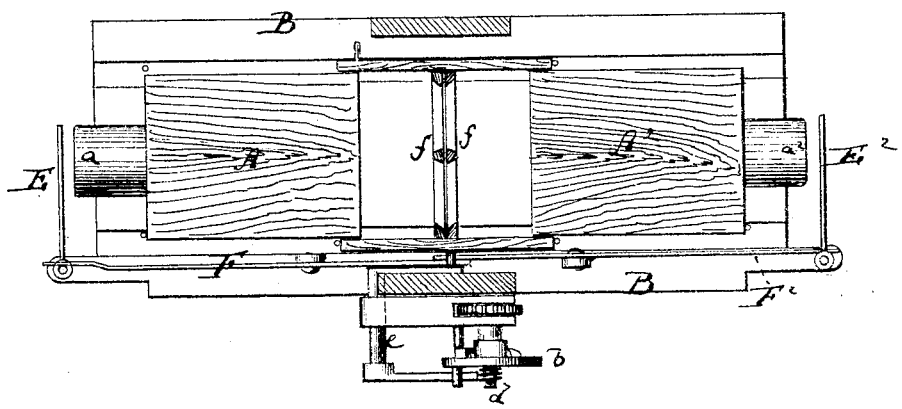

Be it known that I, CHARLES A. WATERBURY, of the city, county, and State of New York, have invented a new and Improved Photographic Printing-Machine, of which the following is a specification:

In the accompanying drawing, Figure 1 represents a side elevation of my improved photographic printing-machine. Fig. 2 is a vertical longitudinal section of the same; Fig. 3, an end elevation, partly in section; and Fig. 4, a horizontal section on the line $c\ c$, Fig. 3.

Similar letters of reference indicate corresponding parts.

This invention has for its object to utilize photography for the rapid production of newspapers or other printed matter, with or without illustrations of suitable kind. The invention consists principally in the arrangement of a photographic camera in conjunction with a paper-feeding apparatus, which latter conveys the paper, at proper intervals of time, into the camera for exposure to the effects of the light, and then carries the photographed paper out of the camera and conveys fresh paper into the same. In this manner the paper can, with the utmost rapidity, be exposed to photographic action, in sheets or in a continuous roll, the positive to be photographed from being stationary in front of the camera. The invention also consists in the use of slides or gates held in front of the lens while the paper is being fed, to exclude the light, and carried clear from the lens or lenses when the paper is stationary within the camera, and in position to receive photographic "imprint" or copy. By turning the gate mechanism in connection with that which feeds the paper, the action of the apparatus can be so nicely regulated as to feed and "print" the paper with the greatest speed. The invention also consists in duplicating the entire above-named apparatus, with the exception of the paper feeder and bath, so as to obtain a print or photographic copy from two different positions or articles simultaneously or successively on opposite sides of the paper. By means of my invention I propose to supersede the ordinary mechanical printing-press, and to substitute in its place an apparatus far cheaper, easier to manipulate, and requiring less power, besides operating fully as rapidly as, or more so, and more accurately than the ordinary process.

A $A^2$ in the drawing are two photographic cameras, placed, by preference, back to back, or in any other relative position, upon a suitable supporting-frame, B, or upon separate frames. They are provided, respectively, with lenses $a\ a^2$, of the ordinary or suitable kind. C C is a series of feed-rollers arranged above the frame B, and serving to feed the paper to be printed upon, when it is drawn down between the two cameras or opposite the back of one first and that of the other next, as may be desired. If the cameras are not in line, or if placed vertically instead of horizontally, the respective positions of parts will necessarily be varied accordingly. H H are rollers which draw the paper down after it has been subjected to the action of the light in the cameras. Below the cameras may also be a suitable paper-cutting and also a folding apparatus. D is a pan or vessel placed in the way of or near the paper before the same reaches the cameras. It contains the sensitizing liquid or chemical and applies it to the paper, either directly or by means of suitable rollers or brushes in such manner that the paper will be sensitive to the photographic action upon entering the cameras or the first camera. The feed-rollers C C are turned in the appropriate directions by suitable mechanism, either gearing, belts, or other, from a suitable driving-shaft, and serve to feed the paper to the camera or cameras with suitable speed. At certain intervals their motion is arrested by an automatic shifting of the driving-pulley $b$ on its shaft $d$, which throws the latter out of gear, or by other suitable means, which will leave the paper immovable while being exposed to the action of the light through the lenses. While the paper is being fed the lenses are closed, or light, rather, is excluded from the cameras by means of gates E $E^2$, which are attached to levers F $F^2$, respectively, or in any other equivalent manner held in place to be instantly thrown out of the way—for liberating the lenses or exposing the paper to photographic action—as soon as the paper has been properly placed in the camera. As long as levers F $F^2$ are used they can be tilted by a crank on a rock-shaft, $e$, that pertains to the driving mechanism. They may, however, be moved by other suitable means. $ff$ are frames which I propose to place within the cameras close to the paper, said frames being of a shape corresponding to that of the spaces to be left entirely white or unacted upon. The bars of which these frames are composed should be V-shaped in cross-section to insure the formation of sharp lines wherever the effect of the light upon the paper commences to become visible.

In printing newspapers, periodicals, or other reading matter on this apparatus I propose to suspend or place the positives or things which are to be duplicated and reversed opposite the lenses, to take the focus by shifting the cameras, which can be done by putting the head between the cameras, a man-hole being, if desired, left for that purpose, or otherwise obtaining the requisite adjustment. The same result may also be accomplished by an apparatus to adjust the negatives or tablets, which apparatus may be operated by a man viewing the tablet or thing to be photographed through the lens.

The mode of sensitizing paper does not constitute any part of my invention, and I use any of the well-known modes described in books or otherwise made known to the public. The paper may be sensitized by a wet or dry process, and is printed accordingly either in a wet or dry state. The finishing process will be like other photographic processes now well understood. The newspaper is printed in the ordinary manner with ink and type, (the type, perhaps, being larger than at present,) and then suspended in front of the lens and photographed.

Having thus described my invention, I claim as new and desire to secure by Letters Patent—

1. The gate or slide E, moved automatically in front of and away from the lens of a photographic camera, or in front of and away from the paper therein held, substantially as and for the purpose herein shown and described.

2. The gate or slide E, combined with the paper-feeder and photographic camera, to operate in conjunction therewith, as set forth.

3. The cameras A $A^2$, gates E $E^2$, and feed mechanism C, combined with each other for printing paper by photographic action simultaneously or in succession on opposite sides, as set forth.

4. The space or blank preserving covering frame $f$ arranged within a photographic camera, substantially as and for the purpose herein shown and described.

5. The process of manufacturing or printing photographic newspapers, periodicals, or other reading matter by photographing the same on opposite sides in a continuous operation, as specified.

CHARLES A. WATERBURY.

Witnesses:
  T. B. MOSHER,
  ALEX. F. ROBERTS.